Sept. 30, 1969 L. DONADIEU ET AL 3,470,508

SUPERCONDUCTING WINDING

Filed Aug. 7, 1967 5 Sheets-Sheet 1

Sept. 30, 1969 L. DONADIEU ET AL 3,470,508

SUPERCONDUCTING WINDING

Filed Aug. 7, 1967 5 Sheets-Sheet 2

United States Patent Office 3,470,508

Patented Sept. 30, 1969

3,470,508

SUPERCONDUCTING WINDING

Lucien Donadieu, Sevres, Edmond Kloeckner, Bures-sur-Yvette, Marcel Aupox, Paris, and Jean Royet, Orsay, France, assignors to Compagnie Generale d'Electricite, Paris, France, a corporation of France Filed Aug. 7, 1967, Ser. No. 658,735
Claims priority, application France, Aug. 5, 1966, 72,170
Int. Cl. H01f 7/22
U.S. Cl. 335—216 20 Claims

ABSTRACT OF THE DISCLOSURE

A superconducting winding including a superconducting conductor in band form wound together with an intercalary element in band form around a central mandrel, the intercalary band or the conductor being deformed so as to provide transverse undulations.

The present invention relates to a superconductive winding having large dimensions which is designed particularly as equipment for large MHD generators, bubble chambers and similar applications.

The practical realization of a great superconductive winding presupposes the prior solution of various problems, and among the most important of these are the following:

(1) It is necessary to make a completely stabilized conductor, that is to say, during the accidental transition to the normal condition of a certain conductor length, the temperature increase within the portion involved must be limited in such a manner that there is no danger of propagation of the transition phenomenon to another part of the winding.

It follows from this definition that the conductor must have a shape which allows for an easy cooling thereof. Furthermore, it is known that the composition thereof must include a certain amount of metal which is a very good conductor of electricity without having superconducting properties.

(2) The windings must be disposed in such a manner as to provide for and produce a superconductive coil which will withstand the considerable electromagnetic forces tending to cause the turns to spark when the operating current flows therethrough, and which will withstand the thermal stresses when the coil is exposed to the cold.

The achievement of a coil structure having the properties outlined hereinabove is the principal object of the present invention.

The present invention relates to a superconductive winding or coil comprising a plurality of flat coils consisting particularly of a mandrel upon which there are wound at least one stabilized superconductive conductor in band form and at least one intercalary element which is not integral mechanically with the conductor and is made from a material having a good mechanical resistance, the different turns of the conductor being separated by the turns of the intercalary element, which coil is characterized in that the intercalary band and/or the conductor are deformed mechanically before winding in a manner such as to include undulations and/or reliefs.

According to a first embodiment of the present invention, the intercalary element is a band made from stainless steel or aluminum alloy provided with transverse ribs or grooves. According to a modified embodiment thereof, the intercalary element is a simple metallic band, preferably also made from stainless steel or aluminum alloy and the conductor is an undulated band.

In accordance with one embodiment of the present invention, the conductor consists of two copper bands having a high conductivity and being equipped with longitudinal ribs and connected, for example, by soldering and/or by being rolled or laminated together, in such a manner that the grooves in combination form channels in which conductors made from superconducting material are positioned. According to a modified embodiment thereof, the conductor consists of an aluminum band having a high degree of purity into which there are inserted wires from superconductive material by means of extrusion, or by means of any other suitable process.

The present invention will be explained hereinbelow in further detail with reference to the accompanying drawings, showing preferred embodiments of the winding or coil proposed by the present invention, and wherein, FIGURE 1 illustrates an embodiment of a conductor chosen as equipment for the winding or coil proposed by the present invention;

Figure 1:
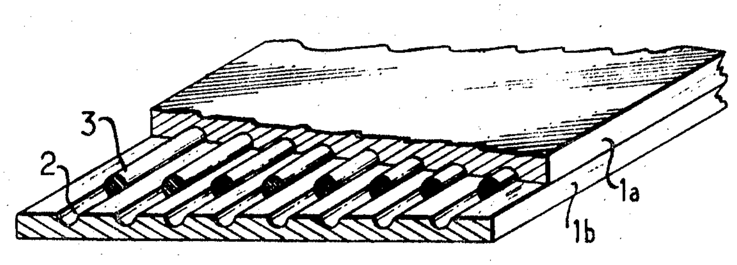
Figure 3:
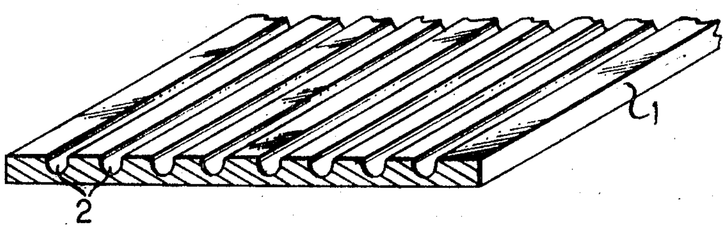
FIGURE 3 illustrates an element forming a part of the constructions illustrated in FIGURES 1 and 2.

The conductor shown in FIGURE 1 has the form of a band made by joining together two copper bands 1*a* and 1*b*, which are identical, as illustrated in detail in FIGURE 3. The copper band, illustrated in FIGURE 1, includes the individual copper bands 1*a* and 1*b* each provide on one of the surfaces thereof with a plurality of grooves or deep furrows 2, which are preferably, but not necessarily, parallel to and equidistant from one another. By joining together two identical bands which have advantageously been soft-soldered by heat and/or pressure, or other suitable means, after tinning of the surfaces which are in contact, cylindrical channels are defined by the grooves. These channels have previously been provided each with a filiform conductor 3 made from superconducting material, for example, a copper-plated and indium-plated, niobium-titanium or niobium-zirconium alloy. The copper which is utilized for the grooved bands is preferably electrolytic copper having a high conductivity (so-called ELHC or also OFHC copper) whose resistivity at 4.2 degrees Kelvin and in a magnetic field near 50 kilogauss is lower than $5.10^{-8}$ ohm-cm.

Figure 2:
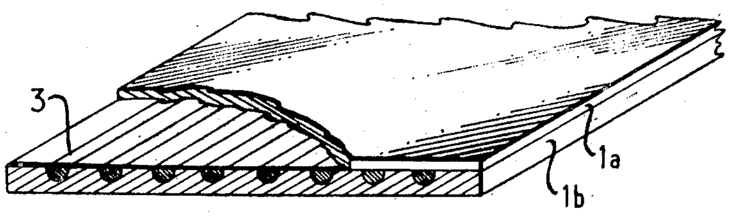
FIGURE 2 illustrates a modified embodiment of a conductor of the type illustrated in FIGURE 1.

According to another embodiment shown in FIGURE 2, only one of the copper bands 16 is grooved. In this case, the conductors 3 are provided with a partially cylindrical cross-section so as to lie entirely within the grooves of the band 1*b*. In this way, an entirely planar band 1*a* free from grooves or channels may form a cover for the conductors.

Figure 4:
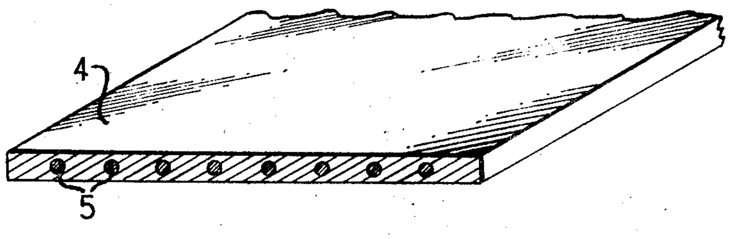
FIGURE 4 illustrates a conductor according to another modified embodiment of the invention.

According to another embodiment shown in FIGURE 4, the conductor is made of an aluminum band having a high degree of purity (preferably higher than 99.99%) and inserted into which are wires or cables 5 made from superconducting material.

The superconducting material may be either a pure metal, or an intermetallic compounds or alloy, such as niobium-tin, niobium-zirconium, or niobium-titanium. The superconducting wires or cabes may be selectively copper-plated, silver-plated, or gold-plated, and more advantageously indium-plated or tin-plated. This conductor is made, according to a known technique, by hot extrusion of aluminum on the wires or cables. The resistivity of the aluminum, after having been brought into form at 4.2 degrees Kelvin and in a field near 50 kilogauss is lower than $5.10^{-8}$ ohm-cm.

Figure 5:
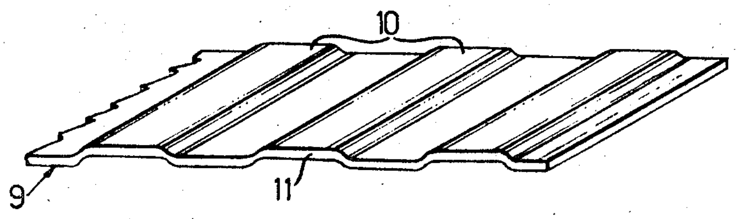
FIGURE 5 illustrates one embodiment of an intercalary band.

Windings in the form of flat coils are obtained in accordance with the invention by coiling a conductor, such as the one illustrated in one of FIGURE 1, 2 ,or 4, on a mandrel made from the light alloy, or stainless steel, which is preferably nonmagnetic. In order to obtain a coil which can withstand the electromagnetic forces and which can be suitably cooled, the conductor is not wound or coiled by itself, but is wound concurrently with a band made from a material having a high mechanical resistance, preferably from an intercalary band, such as illustrated in FIGURE 5. This band assures, moreover, the insulation between the turns, or at least participates therein. As is apparent from FIGURE 5, the intercalary band 9 made from stainless steel or an aluminum alloy having a high mechanical strength and having essentially the same width as the conductor comprises, in accordance with a characteristic of the present invention, a plurality of ribs or rib portions 10 of slight height. It is covered with an insulating layer on the two outer surfaces, for example, a projection of insulating material, such as a polyamide resin or an epoxy resin.

Figures 6, 7:
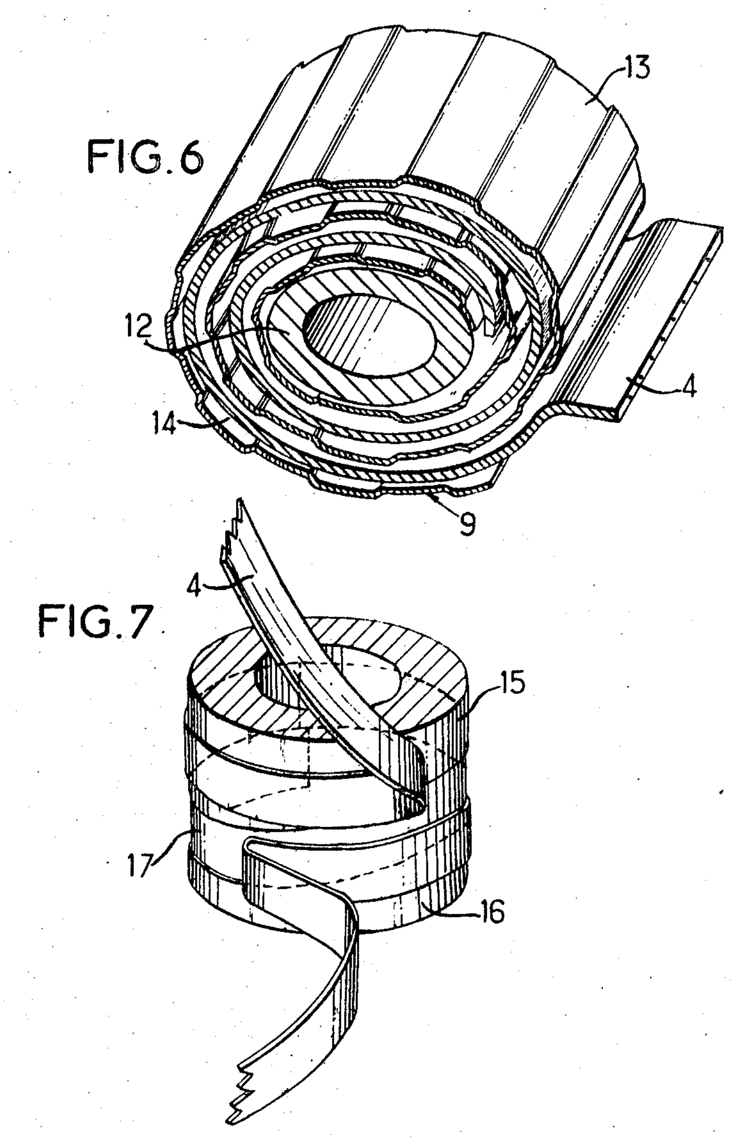
FIGURE 6 illustrates a flat coil in one embodiment relative to the winding thereof.
FIGURE 7 illustrates another embodiment relative to the winding thereof.

FIGURE 6 illustrates a manner of winding a conductor and an intercalary band onto a mandrel. It is the function of the ribs or rib portions 10 of the intercalary band 9 to provide within the flat coil, which is formed of an intercalary band 9 and a conductor 4 wound around a mandrel 12, transverse channels, such as channels 14, used for the circulation therethrough of the cooling fluid.

One of the extremities of the conductor 4 is positioned. in the embodiment shown in FIGURE 6, within the center of the flat coil against the mandrel and so the electrical connections of this extremity of the conductor are difficult to obtain. This difficulty is obviated with the aid of a technique, which is illustrated in FIGURE 7, based upon the use of a mandrel having a height which is equal to at least twice the width of the conductor and by winding this conductor on the higher portion 15 and on the lower portion 16 of the mandrel, starting from the center point of the length of the conductor 4.

A channel 17 may be disposed in the inner surface of the mandrel for purposes of setting in place the first turn of the conductor and facilitating the passage thereof from the lower portion to the higher portion of the mandrel. The use of a metallic hoop or ring which is wound or coiled with the conductor and firmly secured at the two extremities allows for a distribution of the stresses over the entire length of the conductor.

Figure 8:
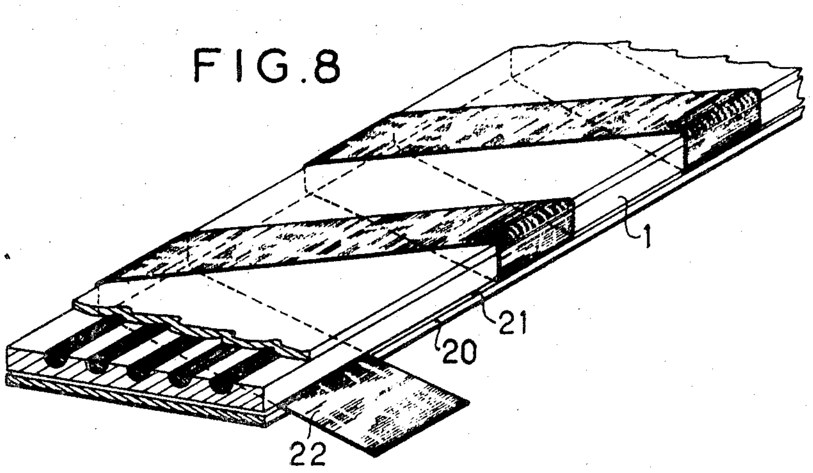
FIGURE 8 illustrates a conductor and the intercalary band thereof in a further embodiment.

According to a modified embodiment of the unit conductor-intercalary band provided for purposes of constructing a coil, a conductor of the type illustrated in FIGURE 1, 2, or 4 (the type illustrated in FIGURE 2 being shown for example) and the intercalary band 20 in the form of a simple band made from stainless steel without ribs or other projections and which has either the same width as, or is slightly wider than, the conductor is illustrated in FIGURE 8. The band is also covered with an insulating layer, for example a polyamide or epoxy resin, and is simply placed against the conductor without any mechanical connection in such a manner as to allow for free play to accommodate the various expansions and constractions of the conductor and the band when the coil is placed in the cooling fluid.

Furthermore, according to a technique known in the art, a supplemental insulation between the conductor and the intercalary band is assured by winding a band 22 made from glass web or cotton impregnated with a polyamide or epoxy resin about the conductor with a large winding pitch. According to this advantageous arrangement, illustrated in FIGURE 9, half of the surface of the conductor is covered while the other half thereof remains bare. According to this technique, the cryogenic fluid is caused to circulate in the space 21 thus produced between the conductor and the intercalary band.

Figure 10:
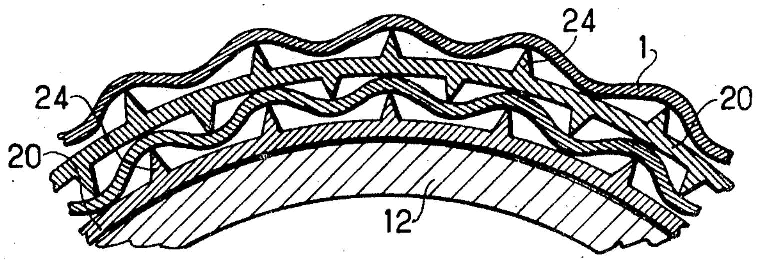
FIGURE 10 shows a portion of the cross section, taken along a plane extending through the axis of a flat coil obtained by winding the conductor as shown in FIGURE 8.

As has been illustrated in FIGURE 10, which shows a portion of the flat coil viewed from the end thereof, the conductor—according to another characteristic of the present invention—is provided with a slight undulation or corrugation with the aid of spacer members such as 24, which may be removable or nonremovable. The conductor is thus susceptible to fluid flow therethrough or to be deformed when placed in the cooling fluid. The spacer members are preferably in the form of rods or wires, and are advantageously made from Teflon. This provision renders it possible to reduce the internal forces of the winding or coil when exposed to the cold, which forces are due to the differences in the expansion coefficients of the various materials. During the exposure to the cold, the spacer members are deformed and permit a free play for the contractions of the conductor which are greater than those of the stainless steel intercalary band.

Figure 11:
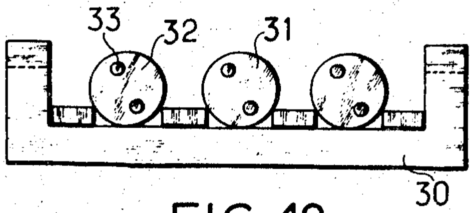
FIGURE 11 is a cross-sectional view of a conductor consisting of cables positioned on an intercalary band according to a further embodiment of the invention.

In accordance with a modified embodiment illustrated in FIGURE 11, the intercalary band 30 serves as support for the superconducting conductors made in the form of a plurality of cables 31. Each cable is made preferably by extrusion of very pure aluminum on superconducting wires or bands 33 made from niobium-zirconium, niobium-titanium, or niobium-tin. Reference numeral 32 designates the aluminum portion of the cable while reference numeral 33 indicates the superconducting materials. The intercalary or supporting band 30 is made preferably from stainless steel or an aluminum alloy and has lateral edges or flanges 34 designed to hold or support the cables laterally in place.

Figure 12:
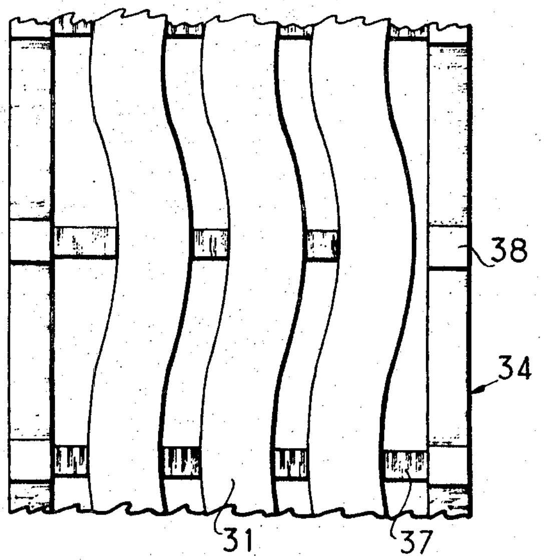
FIGURE 12 is a top plan view of the combination of FIGURE 11.
Figure 13:
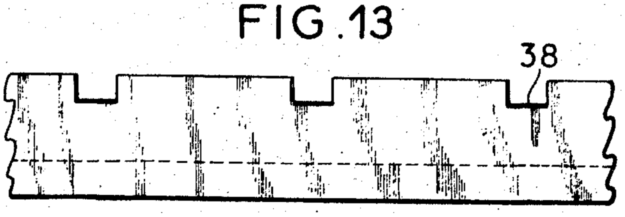
FIGURE 13 is a lateral view of an intercalary band provided with transverse channels at the upper portion thereof.

As illustrated in FIGURE 12, which shows the unit of band-support and cables of FIGURE 11 from above, the cables are not strictly rectilinear but a slight undulation is imparted to them and is maintained in the course of the assembly by means of the introduction of small elements 37, in the form of small spacers of various sizes and shapes made from plastic or other suitable material. This undulation of the cables is necessary in order to compensate for expansion differences between the cables and the band support when the coil is exposed to the cold. This exposure to the cold is assured by the circulation of a cryogenic fluid through the grooves or channels 38 disposed transversely on each of the edges or flanges of the band support 34. This is illustrated in FIGURE 13, which shows a portion of the band support in an elevational view thereof.

Figure 15:
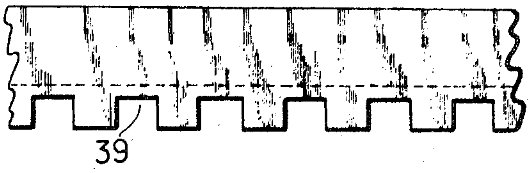
FIGURE 15 is a lateral view of an intercalary band according to a modified embodiment thereof.

In a modified embodiment according to the present invention, the transverse channels provided for purposes of circulating cooling fluid are positioned at the lower portion of the supporting band. This is illustrated in FIGURE 15 which shows a portion of the band support in an elevational view thereof provided with notches 39 disposed over the entire width thereof. This modified embodiment is advantageous for the circulation of the cryogenic fluid in cases where the superconducting cables having a circular cross-section are exchanged for superconducting cables having an either square or rectangular cross-section.

Figure 14:
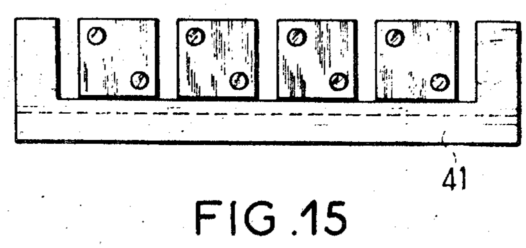
FIGURE 14 illustrates a modified embodiment of the combination of intercalary band and cables.

FIGURE 14 shows the cross-section of a unit or aggregate comprising a supporting band 41 made from stainless steel or aluminum alloy having notches at the lower portion, as illustrated in FIGURE 15, and being equipped with superconducting cables which have a square cross-section and are constituted of wires, bands, or cables from superconducting material positioned in a sheath extruded from pure aluminum. As illustrated in FIGURE 12, the superconducting cables of square cross-section are also given a lsight undulation and are maintained in place by means of intercalary elements 37.

Figure 16:
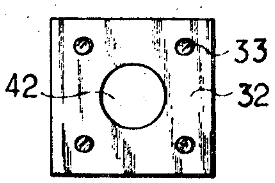
FIGURES 16 and 17 show two modified embodiments of the superconducting cable.
Figure 17:
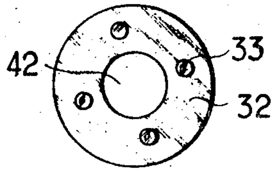

As a modification thereof, it is possible to provide or equip the supporting band with cables analogous to cables of circular or rectangular cross-section but having a central canalization 42. FIGURES 16 and 17 show the cross-section of such cables. The central canalization 42 is used for transporting the cryogenic fluid. The supporting band will, in this case, not of necessity have notches or channels, but will preferably be of the type shown in FIGURE 11.

The elements of FIGURES 11 and 14 and the modifications thereof serve for constituting the coils by winding in flat coils according to the processes described hereinabove. The insulation between the supporting band and the conductor is assured by means of a layer made from polyamide or epoxy resin on the surface of the support. Furthermore, if desired, it is possible to additionally provide between the supporting band and the conductors a band made from fibrous material reinforced with plastic, such as kraft paper impregnated with Mylar.

Figure 9:
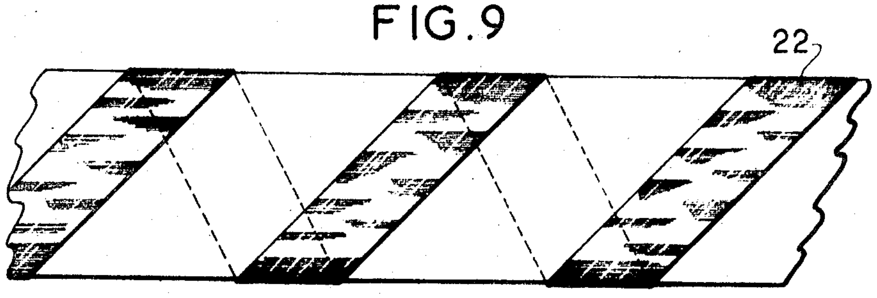
FIGURE 9 illustrates a feature of the embodiment of FIGURE 8 relating to the insulation of the conductor.
Figure 18:
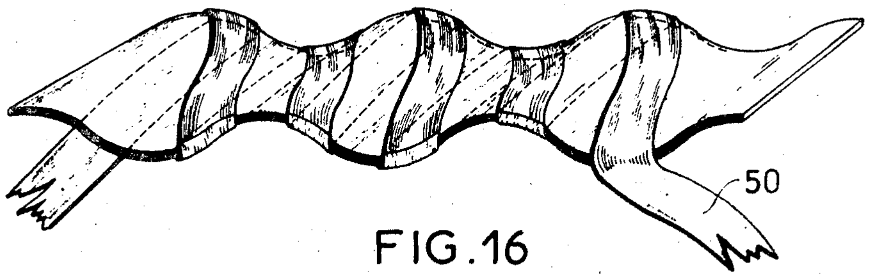
FIGURE 18 illustrates a corrugated conductor provided with the insulating band in accordance with another modification of the invention.

According to a modified embodiment of the invention illustrated in FIGURE 18, the conductor of the type illustrated in FIGURES 1, 2 and 4, is mechanically undulated prior to winding and preferably wrapped with a band made from insulating material 50, in the manner shown in FIGURE 9. The undulations formed prior to the assembly of the coil eliminate the use of clamping elements. The ratio of the amplitude *a* of the undulation and the period *b* is preferably comprised between 0.01 and 0.10. The coil provided with such an undulated conductor is obtained by attaching thereto a hoop or ring consisting of a simple metallic band whose width is either equal to, or preferably greater than, that of the conductor in order to allow the latter to expand freely. Wound on a mandrel are the conductor and the hoop or ring, as has been described hereinabove, and shown in FIGURES 6 and 7.

We have shown and described several embodiments in accordance with the present invention. It is understood that the same is not limited thereto but is susceptible of numerous changes and modifications as known to a person skilled in the art and we, therefore, do not wish to be limited to the details shown and described herein, but intend to cover all such changes and modifications as are encompassed by the scope of the appended claims.

We claim:

1. A superconducting winding or coil comprising
a mandrel,
at least one stabilized superconducting conductor in band form,
at least one intercalary element in the form of a band made from a material having a good mechanical resistance, wound together with said conductor on said mandrel, the conductor being mechanically separate from the intercalary band and the different turns of the conductor being separated with respect to each other by the turns of the intercalary element,
at least one of said intercalary band and said conductor being mechanically deformed so as to present transverse undulations along the length thereof.

2. A superconducting winding or coil as defined in claim 1 wherein said conductor is mechanically deformed so as to present transverse undulations.

3. A superconducting winding or coil as defined in claim 1 wherein said intercalary element is mechanically deformed so as to present transverse undulations.

4. A superconducting winding or coil as defined in claim 1 wherein said intercalary element is a metal band having essentially the same width as said conductor and provided with consecutive flat depressions facing alternately to either side of said band.

5. A superconducting winding or coil according to claim 1, wherein said intercalary element is a band made from a metal having a high mechanical strength covered with a layer of an electrical insulating material.

6. A superconducting winding or coil as defined in claim 1 wherein said intercalary element is made of stainless steel.

7. A superconducting winding or coil as defined in claim 1 wherein said intercalary element is made of an aluminum alloy.

8. A superconducting winding or coil as defined in claim 5 wherein said insulating material is a polyamide resin.

9. A superconducting winding or coil as defined in claim 5 wherein said insulating material is an epoxy resin.

10. A superconducting winding or coil according to claim 1, wherein said conductor consists of two copper bands having a high conductivity, at least one of which is provided with longitudinal grooves, said bands being joined together in such a manner that the grooves will form channels, and further including wires made from superconducting material positioned within said channels.

11. A superconducting winding or coil as defined in claim 10 wherein only one of said bands is provided with grooves and said wires are partially circular in cross-section so as to lie entirely within said grooves.

12. A superconducting winding or coil according to claim 1, wherein said conductor is an aluminum band in which there are embedded wires, made from superconducting material.

13. A superconducting winding or coil according to claim 2, wherein the ratio of the amplitude of the undulation in the conductor to the period thereof is comprised between 0.01 and 0.1.

14. A superconducting winding or coil as defined in claim 13 wherein a plurality of conductors are supported on said intercalary element, said conductors undulating substantially parallel to the plane of said intercalary element.

15. A superconducting winding or coil as defined in claim 14, further including a plurality of spacer elements interposed between conductors along the length thereof to insure maintenance of said undulating configuration.

16. A superconducting winding or coil according to claim 14 wherein the intercalary element is equipped with lateral flanges which serve as a lateral support without mechanical connection for the superconducting cables supported thereby.

17. A superconducting winding or coil according to claim 16, wherein the flanges of the intercalary element are provided with transverse notches.

18. A superconducting winding or coil according to claim 16, wherein the intercalary element is provided with transverse grooves.

19. A superconducting winding or coil as defined in claim 1, wherein said mandrel is at least twice the width of said conductor and is provided with a channel in the surface thereof for setting in place the first turn of the conductor wound thereabout.

20. A superconducting winding or coil according to claim 1 wherein said intercalary element includes a plurality of transverse ribs spaced along the length and disposed on at least one face thereof.

References Cited

UNITED STATES PATENTS

| | | | |
|---|---|---|---|
| 3,205,461 | 9/1965 | Anderson | 335—216 XR |
| 3,306,972 | 2/1967 | Laverick et al. | 335—216 XR |
| 3,332,047 | 7/1967 | Borchert | 335—216 |
| 3,363,207 | 1/1968 | Brechna | 335—216 |

GEORGE HARRIS, Primary Examiner

U.S. Cl. X.R.

174—128